July 23, 1935. C. F. NOWACK 2,008,991
OBJECTIVE ATTACHING MEANS
Filed May 16, 1934
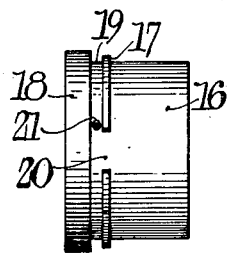
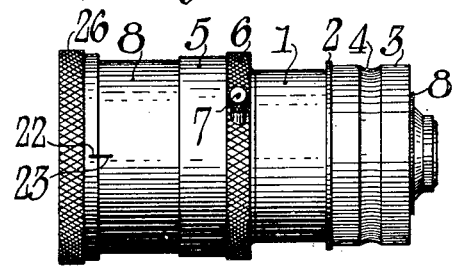
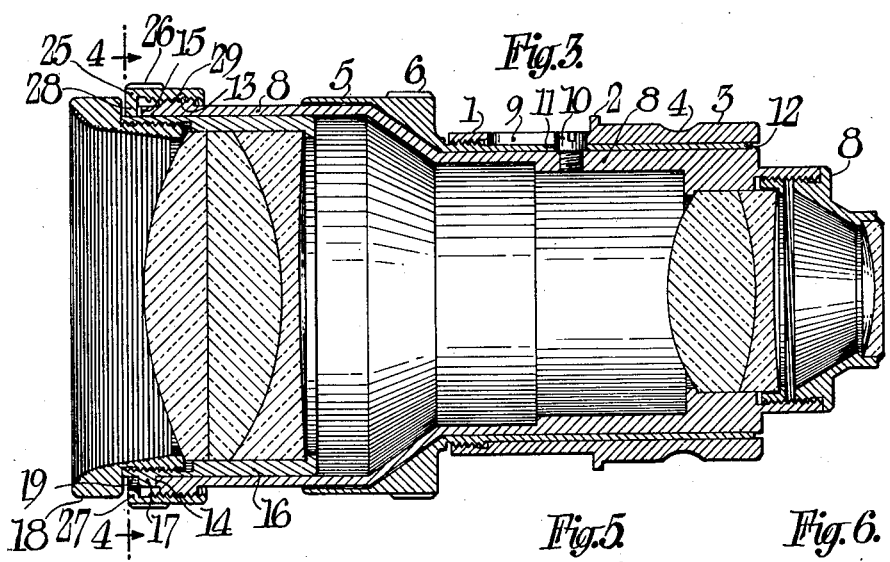
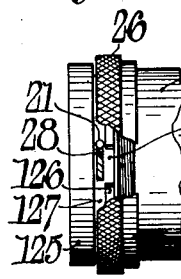
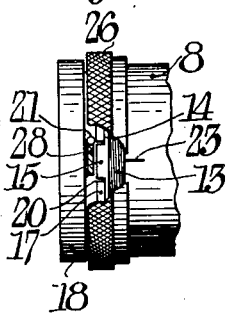
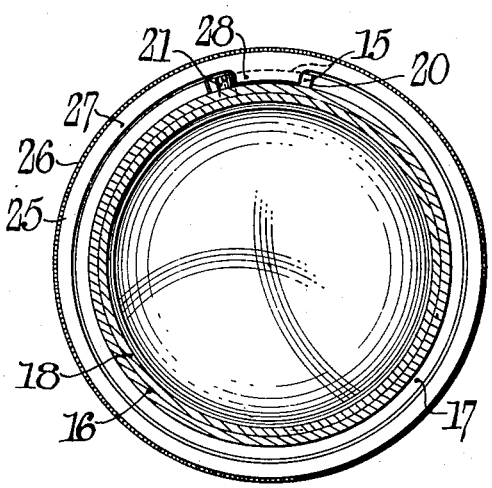
Inventor:
Carl F. Nowack, Patented July 23, 1935

2,008,991

UNITED STATES PATENT OFFICE 2,008,991

OBJECTIVE ATTACHING MEANS

Carl F. Nowack, Rochester, N. Y., assignor to Eastman Kodak Company, Rochester, N. Y., a corporation of New York Application May 16, 1934, Serial No. 725,919

3 Claims. (Cl. 88—57)

This invention relates to photography, and more particularly to an attaching means for mounts containing lenses. One object of my invention is to provide a means for attaching an objective, filter, screen, or the like to a lens barrel. Another object of my invention is to provide a means for attaching such a device in which the device is secured accurately in alignment with the lens axis and in which the device is very securely retained in position. Another object of my invention is to provide an attaching device which can be easily and quickly operated. Another object of my invention is to provide a supplementary lens attachment in which the supplementary lens may be securely retained on a lens barrel in the correct position radially as well as axially of the objective in the barrel. Still another object of my invention is to provide an attachment which can be firmly secured on a lens barrel by means of a threaded ring which can be turned less than 360° to firmly clamp the attachment in position, and other objects will appear from the following specification, the novel features being particularly pointed out in the claims at the end thereof.

Coming now to the drawing wherein like reference characters denote like parts throughout:

Fig. 1 is a side elevation of an objective provided with an attachment and constructed in accordance with and embodying a preferred form of my invention.

Fig. 2 is a side elevation of an attachment removed from an objective.

Fig. 3 is an enlarged sectional view through an objective and a supplemental lens attachment illustrating my invention.

Fig. 4 is a section on line 4—4 of the objective shown in Fig. 3.

Figs. 5 and 6 are fragmentary detail views partially broken away showing attachments constructed in accordance with a different embodiment of my invention.

While it is to be understood that my invention is particularly adapted for holding a lens attachment or a lens element on a lens barrel so that it may be readily changed or altered at will, it is to be understood that this type of latching mechanism is also well suited for holding an objective on a lens board.

In double objectives where the separate elements can be used independently, it is often desirable to place different combinations of lenses together to produce different focal lengths. My invention is particularly adapted to rigidly and accurately position tubular members containing such lenses.

As is well known in the photographic art, it is often desirable to place filters, banded color filters, diffusing screens, and other such lens modifying devices on a lens barrel, and it is desirable to be able to place such attachments quickly on a lens and yet have them held securely in position. In the case of banded color filters it is usually necessary to have the bands in some definite relation to the film as, for instance, in a well-known system of photography in which vertical lenticulations are formed on the film for producing color separation negatives. With this type of film it is necessary to use a color banded filter in which the bands extend parallel to the lenticulations in the film.

But for whatever object a lens attachment may be required, the structure which I will now describe has been found a useful one. In the embodiment shown in the drawing I have illustrated my invention as being applied to an objective designed particularly for use in motion picture projectors in which the objective may be focused back and forth in a tubular mount without having the objective elements themselves turned.

Referring particularly to Fig. 1 the tubular objective mount 1 is provided with a shoulder 2 and a part 3 grooved at 4 for fitting into a standard motion picture projector aperture. There is supported on the member 1 so as to turn thereon a collar 5 which may be knurled at 6 and which preferably has an operating handle 7. When this handle is turned to rotate the collar 5 relative to the tubular member 1, the lens barrel 8 which extends all the way through the collar 5 and the mount 1 is caused to move back and forth without rotation. As will be seen from Fig. 3, member 1 is slotted at 9 to receive a screw head 10 which passes into the tubular lens barrel 8. Thus when the handle 7 is rotated to rotate the collar 5, member 8 is only permitted to slide back and forth relative to the lens mount 1 because of this pin and slot connection. It is understood that the head 10 of the nut slides through a helical slot 11 in the extension 12 of the sleeve 6 as is customary with focusing mounts of this type. As so far described, this construction is well known.

Coming now to my invention, I preferably provide on the end of the tubular member 8 a threaded portion 13, and this tubular member terminates in a shoulder 14 from which a lug 15 may extend, as best shown in Fig. 6.

An attachment to be placed on the tubular member 8 may also consist of a tubular cell as indicated in Fig. 2. This cell may have a smooth tubular exterior surface 16 on which a flange 17 is formed spaced from a main flange 18 on the end of the mount. This leaves a slot 19 between these flanges. I preferably cut away a portion of flange 17, as shown at 20, and provide a stop in the form of a screw 21 which will prevent the attachment from turning more than one revolution with respect to the tubular mount 8, as will be more fully hereinafter described.

Referring to Fig. 6, when the lens mount 16 is placed on the tubular member 8, a scribed line 22 on the mount may be brought opposite to a scribed line 23 on the lens barrel (see Fig. 1) and the attachment may then be slid axially until the lug 15 on the member 8 enters the notch or slot 20 cut in the flange 17 (see Fig. 6). This lug actually fits the slot quite closely, the drawing exaggerating the clearance between these two parts. However, as shown in Fig. 6, when the lug 15 enters the slot 20, it will definitely locate the attachment with respect to the lens mount.

On the end of the lens mount 1, mounted on the thread 13, is a ring 25 knurled at 26 to facilitate handling and having a downwardly extending flange 27. This flange 27, as best shown in Fig. 4, is of an inside diameter sufficient to slide over the top of flange 17.

The flange 27 is also provided with a downwardly extending lug 28, this lug being of such a width that it may pass through the slot 20. As also indicated in Fig. 4, when the lug 28 has passed through the slot 20, the knurled ring 25 can only be turned in a clockwise direction, because if turned in a reverse direction it would strike the stop pin 21. Thus when the parts are assembled and the lug 28 has passed through the slot 20, the knurled ring can be turned relatively to the tubular member 8 by the knurling 26 in a clockwise direction and the cooperating threads 13 and 29 will cause the lug 28 to move inwardly towards the lens mount and bind upon the flange 17, firmly thrusting the tubular mount 16 inwardly until the flange 17 becomes seated tightly on the seat 14 which is the end of the tubular member 8.

In objectives of small size, such as is illustrated, it is only necessary to provide a single aperture 20 and a single locking lug 28. It is obvious, however, that as the size of an objective may increase, it may be necessary to add two or three or, in fact, any number of these inter-engaging members in order to hold the attachment firmly in place on a lens mount.

As will be noted from the drawing, it is impossible to turn the knurled ring 25 more than 360° because of the stop pin 21. In actual practice I prefer to so correlate the movable parts that the knurled ring is actually only turned a small number of degrees to lock the attachment in place, as little as 15 or 20° being usually sufficient.

It will also be seen that with an attachment constructed as above described, an operator is able to quickly and accurately locate the lens attachment on the lens barrel. Moreover, this device is well adapted to attach even lens elements on a lens barrel because of the accuracy of the positioning and locking mechanism. It is well known that objective lens elements must be positioned and axially centered with great accuracy in order to produce satisfactory results.

In cases where the attachment is merely used for plain filters in which it is not essential to prevent rotation of the filter relative to the objective, the structure shown in Fig. 5 may be used. As will appear from this structure, the lens attachment 125 is provided with a flange 126, leaving a groove 127 between these flanges. This groove permits the lug 28 of the locking ring 25 to function exactly as in the embodiment above described. However, the lens mount differs in that the positioning lug 15 is omitted so that the filter mount is not definitely located radially with respect to the objective.

However, I find that even where the attachment does not need to be located so that it cannot turn with respect to the objective, it is somewhat easier to use the construction first described with the locating lens because it is always necessary to have the lens mount in a definite position with respect to the lens barrel and because it is necessary for the lug 28 to pass through the opening 20 in the flange 17 in both positioning and removing the attachment. I therefore prefer to provide the construction shown in Fig. 6.

Having thus described my invention, what I claim as new and desire to secure by Letters Patent of the United States is:

1. In a lens mount attaching mechanism, the combination with a tubular member including a flange, a movable ring threaded to the tubular member, a flange carried by the ring, of a second tubular member adapted to be carried by the first tubular member and including a shoulder substantially complementary in shape to the flange of the first tubular member, locking mechanism adapted to hold the two tubular members together with the flange supporting the complementary shaped shoulder including a lug carried by one tubular member and a seat carried by the other and adapted to cooperate to locate one tubular member on the other, said flange on the movably mounted ring being adapted by moving on its thread to lock the lug in the seat whereby said tubular members may be clamped together.

2. In a lens mount attaching mechanism, the combination with a tubular member including a flange, a movable ring threaded to the tubular member, a flange carried by the ring, of a second tubular member adapted to be carried by the first tubular member and including a shoulder substantially complementary in shape to the flange of the first tubular member, locking mechanism adapted to hold the two tubular members together with the flange supporting the complementary shaped shoulder including a lug carried by one tubular member and a seat carried by the other and adapted to cooperate to locate one tubular member on the other, said flange on the movably mounted ring being adapted by moving on its thread to lock the lug in the seat, and means included in the movable ring and latching structure whereby said tubular members may be clamped together.

3. In a lens mount attaching mechanism, the combination with a tubular lens carrying member including a flange, a ring threaded to the tubular member and movable upon said thread, a flange carried by the ring, of a second flanged tubular member adapted to be attached to the tubular lens carrying member, a second flange thereon spaced from the first flange and having an opening therethrough, a lug carried by the flange of the locking ring adapted to pass through the opening, and a locating lug carried by the tubular lens carrying member adapted to enter the opening and locate the tubular member whereby the first lug, by turning upon its thread, may cause the first lug to lock the tubular member to the lens carrying member and whereby the locating lug may, by entering the opening, definitely locate the tubular member.

CARL F. NOWACK.